Feb. 27, 1968  J. G. LENTA  3,370,861
STEERABLE TOY VEHICLE
Filed March 2, 1966
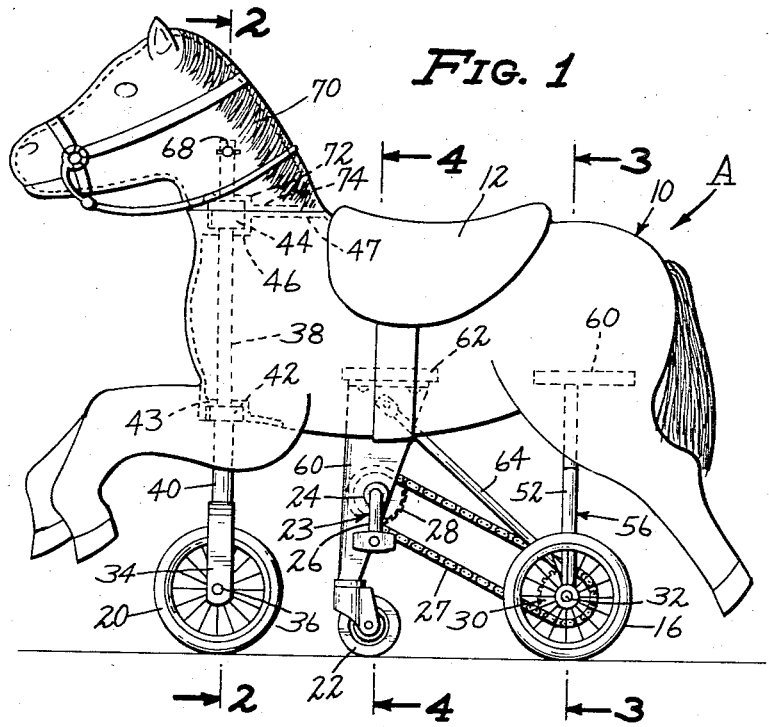
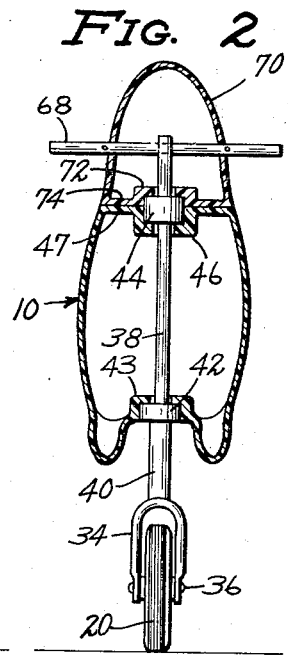
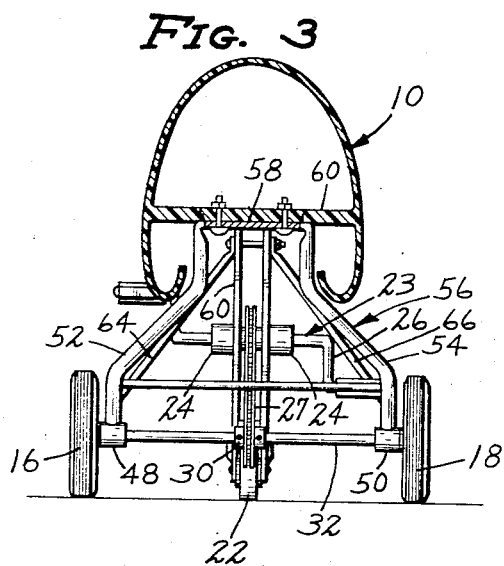
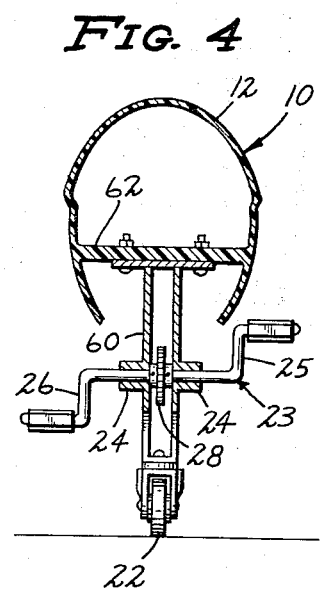
INVENTOR.
JOSEPH G. LENTA
BY
Caswell, Lagaard & Nicks
ATTORNEYS

United States Patent Office 3,370,861
Patented Feb. 27, 1968

3,370,861
STEERABLE TOY VEHICLE
Joseph G. Lenta, 23 E. Buffalo St.,
Duluth, Minn. 55811
Filed Mar. 2, 1966, Ser. No. 531,276
2 Claims. (Cl. 280—1.202)

ABSTRACT OF THE DISCLOSURE

The disclosure relates to a steerable toy vehicle and includes a body member having a single front steering wheel, a pair of spaced rear wheels together with a vertical brace centrally transversely of the body and intermediate the front and rear wheels. The intermediate brace has a caster-type wheel in alignment with the front wheel and the brace is in closer spaced relation to the front wheel than the rear wheels.

---

The invention relates broadly to a vehicle to be ridden by a child and propelled by foot power. The outward appearance of the main body of the device may be that of a horse as disclosed, but any other animal or design may be used.

In mobile foot powered devices having rear wheels and a single front wheel used for steering, the weight upon the single front wheel produces hard steering. It is therefore an object of the invention to provide a foot propelled toy vehicle having rear wheel means and a front wheel which is pivotally mounted for steering, together with a wheel intermediate the front and rear wheels, the intermediate wheel being constructed so as to be steerable and support a portion of the weight of the front of the device whereby ease of steering of the front wheel is effected.

It is a further object of the invention to provide a toy vehicle in which the pedal propelling means therefor includes a crank arm and support therefor with a chain drive to the rear wheels, the crank arm being spaced vertically with respect to the rear wheel means.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a side elevational view of the toy vehicle.

FIGURE 2 is a sectional view on the line 2—2 of FIGURE 1.

FIGURE 3 is a sectional view on the line 3—3 of FIGURE 1.

FIGURE 4 is a sectional view on the line 4—4 of FIGURE 1.

The device A includes the body member or housing 10 having the design of a horse in the present application. The device A is fitted with a saddle device 12 for the child to ride. The device is supported on the ground by means of the rear wheels 18 and 20, the steerable front wheel 20 and the intermediate caster wheel 22. The purpose of having the caster 22 intermediate the front and rear wheels of the vehicle is to support some of the weight of the device, thereby relieving the front wheel 20 of a portion of the weight whereby the steering movement of the front wheel is made easier.

The vehicle A is propelled by a pedal device 23 having crank arms 25 and 26 rotatable in bearings 24 together with a chain 27 about a sprocket 28 mounted on the pedal device which transmits power to the rear sprocket 30 fastened to the rear axle 32 on which the rear wheels 16 and 18 are mounted.

The front wheel 20 is mounted in a fork 34 by means of an axle 36, the fork 34 connected to the lower end of the steering column 38 which is connected to the sleeve 40, the upper end of which rotatively abuts the lower bearing 42 secured to the lower boss portion 42 formed in the housing 10. An upper bearing 44 is provided which is secured in the upper boss portion 46 formed in the housing portion 10 and which supports the steering column 38. The boss 46 depends from the platform portion 47 connected to the body housing 10. The bearings 42 and 44 provide for rotation and take up the thrust load of the front wheel 20.

The rear axle 32 is held in two bushings 48 and 50 mounted on the lower free ends of the legs 52 and 54, respectively, of the framework 56. The base portion 58 of the framework 56 is secured to the brace 60 fastened internally to the housing 10.

The pedal means 24 is rotatably mounted on the vertical brace 60 which is fastened at its upper end to brace 62 centrally thereof, said brace mounted transversely of the body 10. The rear axle 32 is held in position relative to the pedal support 60 by two braces 64 and 66. Also attached to the lower end of the brace 60 is the conventional caster 22. The pedal means 24 is mounted on the brace 60 at a point, vertically speaking, substantially removed upwardly from the horizontal plane of the axles 32 and 36 whereby the pedals thereof can be reached by a child's feet. This is accomplished by the angular disposition of the chain 26 relative to the horizontal.

The vertical position of the caster 22 relative to the front wheel 20 is such that the load of the front portion of the device A is borne by both the caster 22 and the front wheel 20, thereby relieving some of the weight normally upon the wheel 20 and distributing it between wheel 20 and the caster 22. This is accomplished by positioning the vertical brace 60 in closer spaced relation to wheel 20 than rear wheels 18 and 19. While some of the load on the rear wheels is also relieved, the relief of load on the front wheel produces easier steering by means of the construction set forth.

The device A is steered by means of a handle bar 68 secured to the upper end of the column 38 and extending through the head portion 70 of the body 10. The head portion 70 has formed internally thereof the boss portion 72 which is complementary to the boss 46 and in which the bearing 44 is additionally secured. The boss 72 has extended therefrom the platform portion 74 which rotatively engages the platform portion 47 of the main body portion as the head portion 70 is rotated by means of the handle bar 68 to thereby steer the device. As heretofore stated, the front wheel 20 is a ground engaging wheel but the full weight of the front of the device is not borne by the front wheel 20 but is borne partly by the caster 22. As a result, easier steering movement of the front wheel 20 is effected.

The invention is not to be understood as restricted to the details set forth since these may be modified within the scope of the appended claims without departing from the spirit and scope of the invention.

Having thus described the invention, what is claimed as new and desired to be secured by Letters Patent is:

1. A steerable toy vehicle comprising:
   (a) a body member,
   (b) a single ground-engaging front wheel pivotally mounted on the forward portion of said body member for the steering of the vehicle, (c) a pair of ground-engaging rear wheels mounted on the rear portion of said body member, (d) a vertical brace connected to and depending from said body member centrally transversely thereof and intermediate said front wheel and said rear wheel means, (e) said intermediate vertical brace having a wheel mounted on the lower end thereof for rotation about a vertical axis and in longitudinal alignment with said front wheel and a horizontal axis, (f) crank arm pedal means rotatably mounted on said vertical brace, (g) a first sprocket mounted on said crank arm pedal means, (h) a second sprocket connected to said rear wheel means, (i) a chain connecting both of said sprockets for the driving of said rear wheels, (j) the lowermost vertical extent of said intermediate wheel being substantially equal to that of said front wheel, thereby distributing a portion of the weight of the front of the vehicle between said front wheel and intermediate wheel.

2. The device of claim 1 wherein:

(a) said intermediate wheel is in closer spaced relation to said front wheel than said rear wheels.

References Cited

UNITED STATES PATENTS

| | | | |
|---|---|---|---|
| 672,438 | 4/1901 | Black | 280—1.202 X |
| 1,039,813 | 10/1912 | Rude | 280—1.202 |
| 1,448,817 | 3/1923 | Rohan | 280—1.192 |
| 1,625,377 | 4/1927 | Shelley | 280—1.196 X |
| 2,301,036 | 11/1942 | Gray | 280—293 X |
| 2,535,283 | 12/1950 | Groom | 280—293 |
| 2,893,745 | 7/1959 | Stanford | 280—1.184 |

LEO FRIAGLIA, *Primary Examiner.*